United States Patent Office 3,333,944
Patented Aug. 1, 1967

3,333,944
METHOD FOR THE CONTROL OF WEEDS
Sidney B. Richter, Chicago, and Alfred A. Levin, Skokie, Ill., assignors to Velsicol Chemical Corporation, Chicago, Ill., a corporation of Illinois
No Drawing. Original application May 17, 1963, Ser. No. 281,322, now Patent No. 3,296,292, dated Jan. 3, 1967. Divided and this application June 10, 1966, Ser. No. 556,588
4 Claims. (Cl. 71—100)

This application is a division of our co-pending application Ser. No. 281,322, filed May 17, 1963, now U.S. Patent No. 3,296,292.

This invention relates to the production of new pesticidal compositions of matter. More specifically, this invention relates to new chemical compounds of the general formula

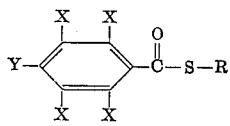

wherein X is halogen; Y is selected from the group consisting of —C(O)—O—R′ and —C(O)—NR²R³; R is selected from the group consisting of methyl and ethyl; R′ is selected from the group consisting of hydrogen and methyl; R² is lower alkoxy; and R³ is selected from the group consisting of hydrogen and lower alkyl. While the halogen can be fluorine, chlorine, bromine, or iodine, the preferred halogen is chlorine or bromine, since the required starting materials are more readily available. A most preferred halogen is chlorine. By lower alkyl and lower alkoxy are meant those groups which contain from one to six carbon atoms, and preferred members of said groups are those which are unsubstituted and acyclic. These new compounds have been found to be useful as pesticides, particularly as herbicides.

The compounds of this invention can be prepared from the appropriate tetrahaloterephthaloyl chloride. For example, compounds wherein X is chlorine can be obtained from the known compound 2,3,5,6-tetrachloroterephthaloyl chloride as starting material. The group

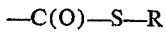

can be introduced by treating each molar proportion of the tetrachloroterephthaloyl chloride with a molar proportion of the mercaptan HSR, wherein R is as defined above. Ordinarily, it is preferred to use the mercaptan in the form of one of its alkali metal salts for convenience in handling. Sodium methyl mercaptan and sodium ethyl mercaptan are good reagents for this reaction.

Once the group —C(O)—S—R has been introduced into the molecule of the intermediates for the compounds of this invention, the group as defined for Y can be introduced readily. For example, if it is desired that the group Y be —C(O)—O—R′, wherein R′ is methyl, the intermediate already containing the —C(O)—S—R group but still having one —C(O)—Cl group can be subjected to alcoholysis with methanol. If it is desired that R′ be hydrogen in the group —C(O)—O—R′, the intermediate can be subjected to hydrolysis with water.

Compounds of this invention in which Y is the group —C(O)—NR²R³ can be prepared by treating the intermediate, which already has the —C(O)—S—R group but still has one —C(O)—Cl group, with appropriate amines HNR²R³, wherein R² and R³ are as defined above. These amines can also be used in the form of their water soluble salts, such as the hydrochlorides, hydrobromides, sulfates, and the like. Some examples of suitable amines are N-methoxy-N-methylamine, N-ethoxy-N-methylamine, N-n-hexyloxy-N-methylamine, N-isopropoxy-N - ethylamine, N-isopropoxy-N-isopropylamine, and the like. Most of these amines are known chemical compounds, while others such as the alkoxyamines HNR²R³ wherein R² is lower alkoxy can be prepared as described by Jones and Major, J. Am. Chem. Soc., vol. 52, pp. 669–79 (1930).

The reactions discussed above are ordinarily carried out in the presence of suitable inert solvents. The temperatures at which the reactions can be carried out are not critical, since some can be carried out satisfactorily at room temperature while others require external heating. Generally, temperatures of from about normal room temperature to about the normal reflux temperature of the reaction mixture are preferred. While the reactions are normally carried out at atmospheric pressure, sub-or super-atmospheric pressures can also be used. The crude reaction products containing the new compounds of this invention are often pure enough for pesticidal use as such; but the compounds can be purified, if desired, by any of the recognized techniques known to the art, such as fractional distillation, crystallization from suitable solvents, or chromatography.

The manner in which the new compounds of this invention can be prepared is illustrated in the following examples, in which all temperatures are in degrees centigrade.

*Example 1.—Preparation of the S-methyl ester of 4-thiocarboxy-2,3,5,6-tetrachlorobenzoyl chloride*

A solution (193 g.) of the sodium salt of methyl mercaptan (0.37 mole) was added with rapid stirring to a solution of 2,3,5,6-tetrachloroterephthaloyl chloride (250 g.; 0.74 mole) in 1800 ml. dioxane in a 5-l., 3-necked flask fitted with a mechanical stirrer and reflux condenser. The mixture was stirred overnight at room temperature, filtered through magnesium sulfate, and allowed to stand. The solvent was then stripped in vacuo to give 205 g. of residue, which was distilled at 134–7°/0.1 mm. (much decomposition) to give 85 g. of the S-methyl ester of 4-thiocarboxy-2,3,5,6-tetrachlorobenzoyl chloride. A portion of the product was crystallized from heptane to give an analytical sample, M.P. 108–9°.

Analysis for $C_9H_3Cl_5O_2S$: Theory percent: C, 30.67; H, 0.86; Cl, 50.30; S, 9.10. Found percent: C, 30.83; H, 0.90; Cl, 50.31; S, 8.76.

*Example 2.—Preparation of methyl S-methyl 2,3,5,6-tetrachloromonothioterephthalate*

A mixture of the S-methyl ester of 4-thiocarboxy-2,3,5,6-tetrachlorobenzoyl chloride (8 g.; 0.022 mole) and 30 ml. methanol was refluxed overnight and cooled. The solid which formed was filtered off and dried to give 7 g. (91% of theory) of methyl S-methyl 2,3,5,6-tetrachloromonothioterephthalate, M.P. 142–3°. A sample was recrystallized from methanol and dried for analysis.

Analysis for $C_{10}H_6Cl_4O_3S$: Theory percent: S, 9.21. Found percent: S, 8.72.

*Example 3.—Preparation of S-methyl 2,3,5,6-tetrachloromonothioterephthalate*

A mixture of the S-methyl ester of 4-thiocarboxy-2,3,5,6-tetrachlorobenzoyl chloride (10 g.; 0.028 mole), 50 ml. dioxane, and 50 ml. water was refluxed overnight and filtered while hot. The filtrate was poured into 500 ml. cold water to precipitate a solid, which was filtered and dried to give 7.82 g. of crude product. The solid was dissolved in methanol and treated with water to precipitate crystals, which were filtered and dried to yield 7.82 g. (83.6% of theory) of S-methyl 2,3,5,6-tetrachloromonothioterphthalate, M.P. 201–2° (slight decomposition).

Analysis for $C_9H_4Cl_4O_3S$: Theory percent: C, 32.36; H, 1.21; Cl, 42.46; S, 9.60. Found percent: C, 32.48; H, 1.46; Cl, 42.29; S, 9.75.

*Example 4.—Preparation of the S-methyl ester of N-methyl - N - methoxy - 4 - thiocarboxy - 2,3,5,6 - tetrachlorobenzamide*

A solution of N-methoxy-N-methylamine hydrochloride (6.7 g.; 0.7 mole) in 20 ml. water was added to a solution of the S-methyl ester of 4-thiocarboxy-2,3,5,6-tetrachlorobenzoyl chloride (20 g.; 0.056 mole) in 50 ml. dioxane in a 250 ml., round-bottomed flask fitted with a mechanical stirrer, reflux condenser, and dropping funnel. A solution of NaOH (4.4 g.; 0.112 mole) in 20 ml. water was then added dropwise with vigorous stirring over 5 min., and the mixture was allowed to stir overnight. The mixture was poured into 500 ml. water, and the precipitated solid was extracted with ether. The ether solution was washed with water, dried over magnesium sulfate, filtered, and stripped of solvent. The residual solid was crystallized from methanol and dried to give 12.3 g. (58,3% of theory) of the S-methyl ester of N-methyl-N-methoxy - 4 - thiocarboxy - 2,3,5,6 - tetrachlorobenzamide, M.P. 130–132°.

Analysis for $C_{11}H_9Cl_4NO_3S$: Theory percent: C, 35.04; H, 2.42; Cl, 37.61; N, 3.72; S, 8.50. Found percent: C, 34.62; H, 2.47; Cl, 38.67; N, 3.38; S, 8.01.

A wide variety of other compounds within the scope of this invention can be prepared in a manner similar to that detailed in the above examples. Given in the following examples are the reactants which can be used to prepare the indicated named compounds of this invention. For brevity, certain of the starting materials are identified as follows: Compound A is the S-methyl ester of 4-thiocarboxy-2,3,5,6-tetrachlorobenzoyl chloride; Compound B is the S-ethyl ester of 4-thiocarboxy-2,3,5,6-tetrachlorobenzoyl chloride.

*Example 5*

Compound A+N-methoxy-N-ethylamine=The S-methyl ester of N-methoxy-N-ethyl-4-thiocarboxy-2,3,5,6-tetrachlorobenzamide.

*Example 6*

Compound A+methoxylamine=The S-methyl ester of N-methoxy-4-thiocarboxy-2,3,5,6-tetrachlorobenzamide.

*Example 7*

Compound B+N-ethoxy - N - ethylamine=The S-ethyl ester of N - ethoxy - N - ethyl-4-thiocarboxy-2,3,5,6-tetrachlorobenzamide.

*Example 8*

Compound B+Ethoxylamine=The S-ethyl ester of N-ethoxy-4-thiocarboxy-2,3,5,6-tetrachlorobenzamide.

*Example 9*

Compound B+N-n-hexyloxy-N-methylamine=The S-ethyl ester of N - n - hexyloxy - N - methyl-4-thiocarboxy-2,3,5,6-tetrachlorobenzamide.

*Example 10*

Compound B+methanol=Methyl S-ethyl 2,3,5,6-tetrachloromonothioterephthalate.

*Example 11*

Compound B+water=S-Ethyl 2,3,5,6-tetrachloromonothioterephthalate.

For practical use as herbicides, the compounds of this invention are generally incorporated into herbicidal compositions which comprise an inert carrier and a herbicidally toxic amount of such a compound. Such herbicidal compositions, which can be called formulations, enable the active compound to be applied conveniently to the site of the weed infestation in any desired quantity. The compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

*Example 12.—Preparation of a dust*

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perenniials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, soil samples seeded with various weeds were sprayed within 24 hours with aqueous emulsions of the test compounds. After the sprays were applied to the soil, the containers were maintained under greenhouse conditions for 15–20 days. The plants were then observed for injury, and the degree of injury was rated as follows: 0=no injury; 1, 2=slight injury; 3, 4=moderate injury; 5, 6=moderately severe injury; 7, 8, 9=severe injury; 10=death. In these experiments, the product of Example 2, namely methyl S-methyl 2,3,5,6-tetrachloromonothioterephthalate, caused injury rated at 7 on foxtail when used at a rate equivalent to 8 lbs./acre. At the rate of only 2 lbs./acre, this compound caused injury rated at 9 on crabgrass as well as on barnyard grass. The latter weed is especially troublesome in the cultivation of rice; and it is significant that the subject compound was completely non-toxic to rice at dosages as high as 8 lbs./acre.

Similarly, post-emergence tests were carried out by spraying the test compounds on the foliage of weeds which had attained a prescribed size. The sprayed plants were maintained under greenhouse conditions for 13 days, after which the degree of injury was rated on the same scale as described above. In these tests, the compound methyl S-methyl 2,3,5,6-tetrachloromonothioterephthalate caused injury rated at 8 on mustard and pigweed when used at a rate equivalent to 8 lbs./acre.

We claim:
1. The method for the control of weeds which comprises contacting said weeds with a herbicidal composition comprising an inert carrier and as the essential active ingredient, in a quantity which is herbicidally toxic to said weeds, a compound of the formula

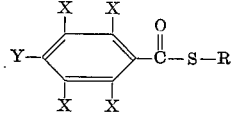

wherein X is halogen; Y is selected from the group consisting of —C(O)—O—R' and —C(O)—NR²R³; R is selected from the group consisting of methyl and ethyl; R' is methyl; R² is lower alkoxy; and R³ is selected from the group consisting of hydrogen and lower alkyl.

2. The method of claim 1 wherein the essential active ingredient is methyl S-methyl 2,3,5,6-tetrachloromonothioterephthalate.

3. The method of claim 1 wherein the essential active ingredient is S-methyl 2,3,5,6-tetrachloromonothioterephthalate.

4. The method of claim 1 wherein the essential active ingredient is methyl S-ethyl 2,3,5,6-tetrachloromonothioterephthalate.

References Cited

FOREIGN PATENTS 1,265,053  5/1961  France.

LEWIS GOTTS, *Primary Examiner.*

JAMES O. THOMAS, JR., *Examiner.*